US008963943B2

(12) United States Patent
Chu et al.

(10) Patent No.: US 8,963,943 B2
(45) Date of Patent: Feb. 24, 2015

(54) THREE-DIMENSIONAL URBAN MODELING APPARATUS AND METHOD

(75) Inventors: Chang-Woo Chu, Daejeon (KR); Ho-Won Kim, Daejeon (KR); Bon-Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 481 days.

(21) Appl. No.: 12/971,162

(22) Filed: Dec. 17, 2010

(65) Prior Publication Data

US 2011/0148866 A1   Jun. 23, 2011

(30) Foreign Application Priority Data

Dec. 18, 2009 (KR) .................. 10-2009-0127123
Mar. 3, 2010 (KR) .................. 10-2010-0018863

(51) Int. Cl.
*G09G 5/00* (2006.01)
*G06T 17/05* (2011.01)
*G06T 15/04* (2011.01)

(52) U.S. Cl.
CPC .................. *G06T 17/05* (2013.01); *G06T 15/04* (2013.01)
USPC ............. 345/582; 345/419; 345/427; 382/294

(58) Field of Classification Search
CPC ....... G06T 17/05; G06T 17/20; G06T 5/0018; G06F 17/30241
USPC .................................. 345/419, 423
See application file for complete search history.

(56) References Cited

U.S. PATENT DOCUMENTS

| 6,633,664 | B1* | 10/2003 | Minamida et al. ............ 382/154 |
| 7,343,268 | B2* | 3/2008 | Kishikawa ........................ 703/1 |
| 7,583,275 | B2* | 9/2009 | Neumann et al. ............. 345/633 |
| 8,194,074 | B2* | 6/2012 | Brown .......................... 345/428 |
| 8,422,825 | B1* | 4/2013 | Neophytou et al. .......... 382/294 |

(Continued)

FOREIGN PATENT DOCUMENTS

| KR | 10-2004-0004684 | 1/2004 |
| KR | 10-2009-0003787 | 1/2009 |

OTHER PUBLICATIONS

Li, Zhilin, et al., Digital Terrain Modeling Principles and Methodology, CRC Press 2004, Chapter 12, pp. 247-262.*

(Continued)

*Primary Examiner* — Hau Nguyen
*Assistant Examiner* — Ryan M Gray
(74) *Attorney, Agent, or Firm* — Staas & Halsey LLP

(57) ABSTRACT

Disclosed herein is a 3D urban modeling apparatus and method. The 3D urban modeling apparatus includes a calibration unit for calibrating data about a translation and a rotation of at least one capturing device at a time that input aerial images and terrestrial images were captured. A building model generation unit generates at least one 3D building model based on the aerial images and the terrestrial images to which results of the calibration have been applied. A terrain model generation unit generates a 3D terrain model by converting an input digital elevation model into a 3D mesh. A texture extraction unit extracts textures related to the building model and the terrain model from the aerial images and the terrestrial images. A model matching unit generates a 3D urban model by matching the building model with the terrain model, which are based on the textures, with each other.

20 Claims, 2 Drawing Sheets

(56) References Cited

U.S. PATENT DOCUMENTS

| | | | |
|---|---|---|---|
| 8,818,076 B2* | 8/2014 | Shenkar et al. | 382/154 |
| 2004/0105090 A1 | 6/2004 | Schultz et al. | |
| 2005/0177350 A1 | 8/2005 | Kishikawa | |
| 2008/0221843 A1* | 9/2008 | Shenkar et al. | 703/1 |
| 2008/0310757 A1* | 12/2008 | Wolberg et al. | 382/285 |
| 2009/0009513 A1* | 1/2009 | van den Hengel et al. | 345/420 |
| 2009/0141020 A1* | 6/2009 | Freund et al. | 345/419 |

OTHER PUBLICATIONS

Fruh, Christian, and Avideh Zakhor. "Constructing 3D city models by merging aerial and ground views." Computer Graphics and Applications, IEEE 23.6 (2003): 52-61.*

Wu, Changchang, et al. "3d model matching with viewpoint-invariant patches (vip)." Computer Vision and Pattern Recognition, 2008. CVPR 2008. IEEE Conference on. IEEE, 2008.*

Sameer Agarwal, et al., "Building Rome in a Day", University of Washington, Cornell University, Microsoft Research.

* cited by examiner

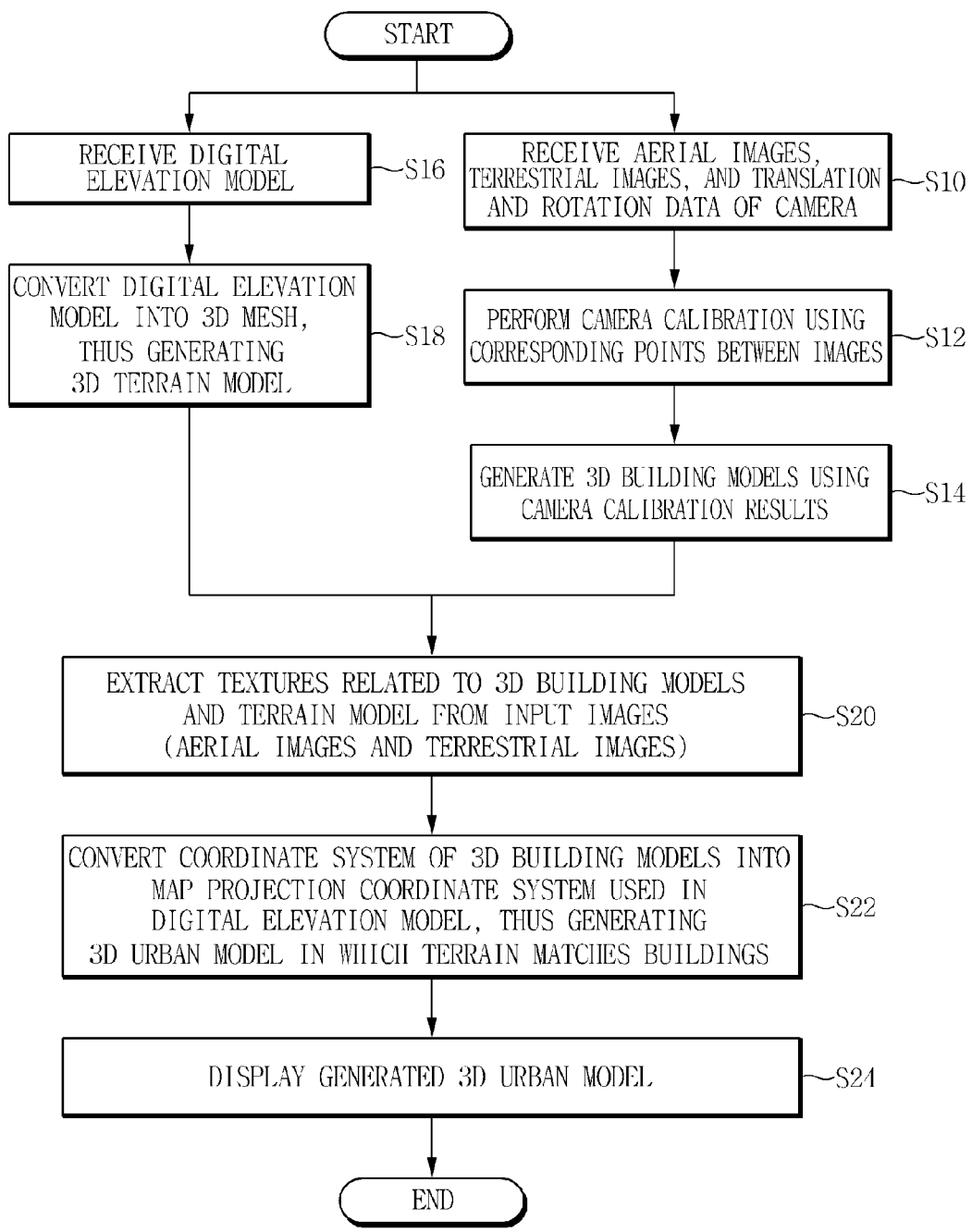

THREE-DIMENSIONAL URBAN MODELING APPARATUS AND METHOD

CROSS REFERENCE TO RELATED ED APPLICATIONS

This application claims the benefit of Korean Patent Application Nos. 10-2009-0127123, filed on Dec. 18, 2009, and 10-2010-0018863, filed on Mar. 3, 2010, which are hereby incorporated by reference in their entirety into this application.

BACKGROUND OF THE INVENTION

1. Technical Field

The present invention relates generally to a three-dimensional (3D) urban modeling apparatus and method, and, more particularly, to a 3D urban modeling apparatus and method, which uses a digital elevation model and images captured from an aircraft or captured on the ground.

2. Description of the Related Art

Map services using high-resolution satellite images have been widely popularized alongside the propagation of the ultra high-speed Internet.

In addition, road view- or street view-type services that use terrestrial images captured on the ground have attracted attention as a new type of service.

Map services using satellite images are provided so that building or road names can be indicated on satellite images covering an area that a user desires to look over, and so that a path can be occasionally searched for after a source and a destination have been given.

Further, map services enable images captured from a relevant area by the user on the ground to be uploaded onto a server and allow the atmosphere of the area as well as satellite images to be viewed even using terrestrial images. Furthermore, such a map service also enables a three-dimensional (3D) model personally produced by the user to be shared, thus enabling a relevant area to be viewed in three dimensions.

However, a map service using satellite images is disadvantageous in that the satellite images may have low resolution depending on the region, thereby making it difficult to accurately identify a certain region and providing slightly monotonous images.

In contrast, a road view or street view service which has recently been initiated provides a service for acquiring images using an omnidirectional camera (for example, a device capable to of capturing the entire field of view corresponding to 360° at a time) mainly mounted on a vehicle, and for displaying the captured images in the form of a continuous panorama of images. Accordingly, the user can gain information about a relevant area in an environment in which he or she seems to look around the area from the position of being on the actual street. Further, such a road view or street view service enables a service associated with satellite images because a camera is operated in association with a Global Positioning System (GPS) to know the captured location when capturing images.

These conventional technologies are intended to provide two-dimensional plane information.

Meanwhile, research into the generation of a 3D model of a building using satellite images or aerial images has also been widely carried out.

However, since the portion that a building occupies in most images is small, the accuracy of the building is deteriorated. Further, there are problems in that the textures of the sides of a building are not indicated in many cases, and that the quality of textures is inferior on the whole.

SUMMARY OF THE INVENTION

Accordingly, the present invention has been made keeping in mind the above problems occurring in the prior art, and an object of the present invention is to provide a 3D urban modeling apparatus and method, which models the 3D appearances of urban buildings and 3D terrain using a Digital Elevation Model (DEM) and images captured from an aircraft and captured on the ground, and extracts realistic textures from the images.

Another object of the present invention is to provide a 3D urban modeling apparatus and method, which can generate 3D models of buildings using aerial images captured in vertical and to oblique directions, in addition to a DEM, and extract textures related to the 3D models, and which can more minutely model 3D models from images captured on the ground or extract higher-resolution textures.

In accordance with an aspect of the present invention accomplish the above objects, there is provided a three-dimensional (3D) urban modeling apparatus, including a calibration unit for calibrating data about a translation and a rotation of at least one capturing device at a time that input aerial images and terrestrial images were captured; a building model generation unit for generating at least one 3D building model based on the aerial images and the terrestrial images to which results of the calibration by the calibration unit have been applied; a terrain model generation unit for generating a 3D terrain model by converting an input digital elevation model into a 3D mesh; a texture extraction unit for extracting textures related to the building model and the terrain model from the aerial images and the terrestrial images; and a model matching unit for generating a 3D urban model by matching the building model with the terrain model, which are based on the textures, with each other.

Preferably, the calibration unit may select captured images of buildings to be modeled from among the aerial images and the terrestrial images using the data about the translation and rotation of the capturing device, and calibrate the selected images. In this case, the 3D urban modeling apparatus may further include a translation and rotation data input unit for receiving the data about the translation and the rotation of the capturing device and transmitting the translation and rotation data to the calibration unit.

Preferably, the calibration unit may be configured such that when an image that has no data about the translation and the rotation of the capturing device is input, the calibration unit calculates the data about the translation and rotation of the capturing device at the time that the aerial images and the terrestrial images were captured, by using corresponding relationships between vertexes of a previously constructed 3D building model and feature points of the images and previously calculated intrinsic parameters of the capturing device.

Preferably, the building model generation unit may generate a first 3D building model by causing primitive figures forming a principal shape of a building to correspond to calibrated images, and generate the 3D building model by editing the first 3D building model using 3D mesh editing and by modeling a fine appearance of the building.

Preferably, the building model generation unit may generate a first 3D building model using the aerial images, and generate the 3D building model by modeling a preset area above a ground surface of the first 3D building model using the terrestrial images via 3D modeling.

Preferably, the texture extraction unit may extract textures related to individual faces of the 3D building model using corresponding relationships between the faces constituting the 3D building model, generated by the building model generation unit, and the images.

Preferably, the texture extraction unit may extract orthographically projected textures in which a hidden portion is not present on each face constituting the building model.

Preferably, the texture extraction unit may extract the textures of the terrain model by establishing corresponding relationships between images captured in a vertical direction, among the aerial images, and the terrain model.

Preferably, the texture extraction unit may extract textures related to the terrain model such that a hidden portion is not present in the textures.

Preferably, the model matching unit may convert a coordinate system of the building model into a map projection coordinate system of the digital elevation model, thus generating the 3D urban model in which the building model matches the terrain model.

In accordance with another aspect of the present invention, there is provided a three-dimensional (3D) urban modeling method, including calibrating data about a translation and a rotation of at least one capturing device at a time that input aerial images and terrestrial images were captured, using a calibration unit; generating at least one 3D building model based on the aerial images and the terrestrial images to which results of the calibration have been applied, using a building model generation unit; generating a 3D terrain model by converting an input digital elevation model into a 3D mesh, using a terrain model generation unit; extracting textures related to the building model and the terrain model from the aerial images and the terrestrial images, using a texture extraction unit; and generating a 3D urban model by matching the building model and the terrain model, which are based on the textures, with each other, using a model matching unit.

Preferably, the calibrating the data may be configured to perform calibration by selecting captured images of buildings to be modeled, from among the aerial images and the terrestrial images, using the data about the translation and rotation of the capturing device.

Preferably, the generating the 3D building model may include generating a first 3D building model by causing primitive figures forming a principal shape of a building to correspond to calibrated images; and editing the first 3D building model using 3D mesh editing and then modeling a fine appearance of the building.

Preferably, the generating the 3D may include generating a first 3D building model using the aerial images; and generating the 3D building model by modeling a preset area above a ground surface of the first 3D building model using the terrestrial images via 3D modeling.

Preferably, the extracting the textures may be configured to extract textures related to individual faces of the building model using corresponding relationships between the faces constituting the building model and the images.

Preferably, the extracting the textures may be configured to extract orthographically projected textures in which a hidden portion is not present on each face constituting the building model.

Preferably, the extracting the textures may be configured to extract the textures of the terrain model by establishing corresponding relationships between images captured in a vertical to direction, among the aerial images, and the terrain model.

Preferably, the extracting the textures may be configured to extract textures related to the terrain model such that a hidden portion is not present in the textures.

Preferably, the matching the models may be configured to convert a coordinate system of the building model into a map projection coordinate system of the digital elevation model, thus generating the 3D urban model in which the building model matches the terrain model.

BRIEF DESCRIPTION OF THE DRAWINGS

The above and other objects, features and advantages of the present invention will be more clearly understood from the following detailed description taken in conjunction with the accompanying drawings, in which:

FIG. 2 is a flowchart showing a 3D urban modeling method according to an embodiment of the present invention.

DESCRIPTION OF THE PREFERRED EMBODIMENTS

Figure 1:
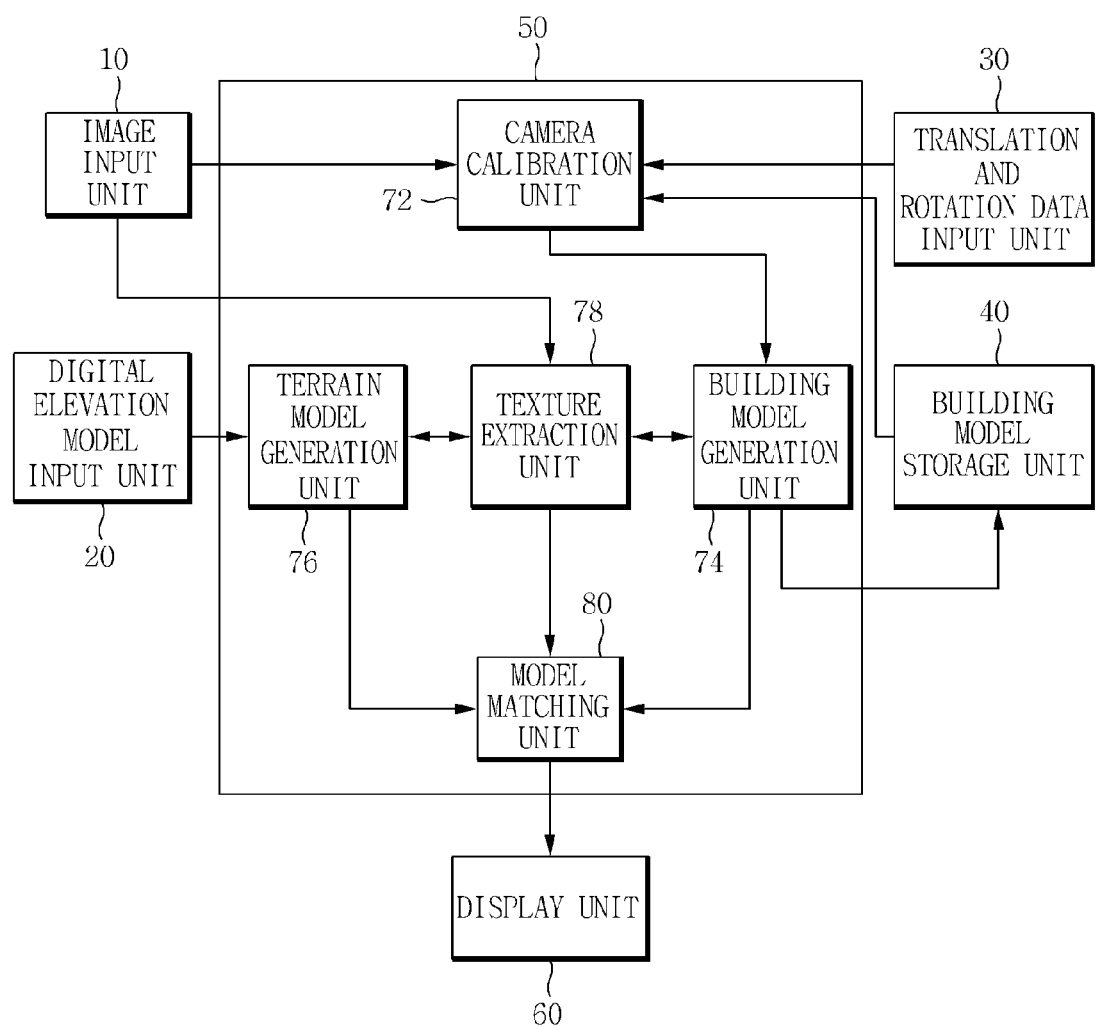
FIG. 1 is a block diagram showing a system employing a 3D urban modeling apparatus according to an embodiment of the present invention.

Hereinafter, embodiments of a 3D urban modeling apparatus and method according to the present invention will be described in detail with reference to the attached drawings. The terms and words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

In order to generate a 3D model from a plurality of images (for example, aerial images and terrestrial images), the accurate positions and postures of cameras at the time that the images were captured must be known. Further, in order to generate a 3D model of a city as in the case of the present invention, a large number of buildings must be modeled in three dimensions. For this, since a large number of images are required, a matching approach is required such that 3D modeling is separately performed on individual buildings and matching is performed to comply with the coordinate system (for example, Transverse Mercator: TM) of a DEM. Therefore, the operation of selecting only captured images of the target buildings to be modeled from among a larger number of aerial images and terrestrial images must be primarily performed. For this operation, information about the positions and postures of the cameras at the time that the images were captured is additionally input. Recently, a technology has been developed in which cameras for capturing the terrestrial images (including pictures), as well as aerial images (including pictures), work in conjunction with Global Positioning System (GPS)/Inertial Navigation System (INS) equipment, and in which information about the positions and postures of the cameras at the time that the images were captured is recorded together with the images. This equipment is utilized in this way, and thus the translation and rotation data of the cameras only needs to be acquired together with images. Since a large number of images must be acquired within a short period of time so that an urban area can be modeled in three dimensions, as in the case of the present invention, images can be captured while a vehicle equipped with the GPS/INS equipment is moving. However, generally, most cameras that are popularized do not work in conjunction with GPS. In this case, a user specifies which building was captured, and to thus can replace the function of GPS/INS equipment.

The translation and rotation may be a position, direction and/or posture of the cameras. Therefore, the translation and rotation data of the cameras may be data about a position, direction and/or posture of the cameras.

FIG. 1 is a block diagram showing a system for employing a 3D urban modeling apparatus according to an embodiment of the present invention.

The system of FIG. 1 includes an image input unit 10, a Digital Elevation Model (DEM) input unit 20, a translation and rotation data input unit 30, a building model storage unit 40, a 3D modeling unit 50, and a display unit 60.

The image input unit 10 receives images stored in a computer or the like, that is, aerial images of a city captured over the city, and terrestrial images captured on the ground.

The DEM input unit 20 receives a Digital Elevation Model (DEM). Here, DEM refers to a 3D (x, y, z) model including elevations at locations at which the terrain changes at regular intervals.

The translation and rotation data input unit 30 receives data about the translation and rotation of each capturing device (for example, a camera) at the time that aerial images were captured and terrestrial images from a position/posture sensor (not shown).

The building model storage unit 40 stores various 3D building models. Of course, the building model storage unit 40 may also store 3D building models generated by the 3D modeling unit 50, which will be described later. As the occasion demands, the information stored in the building model storage unit 40 may be updated.

The 3D modeling unit 50 generates a realistic 3D urban model. The internal construction of the 3D modeling unit 50 will be described in detail later.

The display unit 60 displays the 3D urban model generated by the 3D modeling unit 50 on a screen.

The 3D modeling unit 50 includes a camera calibration unit 72, a building model generation unit 74, a terrain model generation unit 76, a texture extraction unit 78, and a model matching unit 80.

The camera calibration unit 72 calibrates data about the translation and rotation of the camera at the time that the aerial images and the terrestrial images received from the image input unit 10 were captured. The translation and rotation data of the camera which has been input to the translation and rotation data input unit 30 may contain errors owing to the velocities of an aircraft and a vehicle in addition to the errors resulting from the position/posture sensor itself (for example, GPS/INS equipment: not shown). Accordingly, the camera calibration unit 72 performs accurate camera calibration using the corresponding points between images to reduce such errors and accurately detect the translation and rotation of the camera at the time that the images were captured. In this case, before image-capturing, intrinsic parameters, such as the focal distance of each camera and the coordinates of a principal point, lens distortion coefficients, etc. are measured in advance. When captured images of specific buildings are selected, the camera calibration unit 72 performs a procedure for extracting feature points from the images, establishing corresponding relationships between the images, and eliminating erroneously established corresponding relationships. Individual steps of the procedure may be performed either using a typically known method, or manually via an interface that can be personally set or edit by the user. When the corresponding relationships between the images are established, the camera calibration unit 72 calculates the translation and rotation of the camera using the previously measured intrinsic parameters and the corresponding relationships. Further, the camera calibration unit 72 performs optimization for reducing reprojection errors using a technique such as bundle adjustment. That is, the camera calibration unit 72 selects captured images of target buildings to be modeled from among a plurality of images and calibrates the selected images on the basis of the translation and rotation data of the camera which was to obtained at the time that the images were captured and which was acquired from the position/posture sensor (not shown). Meanwhile, with respect to images that have no data about the translation and rotation of the camera at the time that the images were captured (that is, when the translation and rotation data input unit 30 is not provided), the camera calibration unit 72 calculates the translation and rotation of the camera at the time that the images were captured by using the corresponding relationships between the vertexes of 3D building models, previously stored (constructed) in the building model storage unit 40, and the feature points of the images, and previously calculated intrinsic parameters of the camera. Preferably, the camera calibration unit 72 is understood to be a calibration unit described in the claims of the present invention. FIG. 1 illustrates an example in which both the translation and rotation data input unit 30 and the building model storage unit 40 are included in the apparatus, but it does not matter if only one of the translation and rotation data input unit 30 and the building model storage unit 40 is present when implementing the present invention.

The building model generation unit 74 uses the results of the calibration by the camera calibration unit 72. Typically, when corresponding points between two camera-calibrated images are known, 3D straight lines which pass through the origins of respective cameras and the feature points of the images can be detected. Intersection points between the 3D straight lines and the corresponding points of the two images are calculated, so that 3D coordinates of points captured in two dimensions can be ascertained. When a large number of 3D coordinates on the outer walls of buildings are calculated using this method, the 3D building models can be reconstructed into 3D meshes using those 3D coordinates. This method enables 3D meshes to be automatically generated, but is disadvantageous in that the data size of the generated meshes is too large to be applied to services such as the Internet. In order to overcome this disadvantage, the building model generation unit 74 inserts basic figures (primitive figures) such as a rectangular parallelepiped and a plane forming the principal shape of individual buildings into the images so that the figures correspond to the feature points of the individual images, thus primarily generating coarse 3D building models. Further, the building model generation unit 74 models the fine appearances of the buildings by editing the coarse 3D building models. For this operation, the building model generation unit 74 uses a 3D mesh editing technique such as division, push/pull, and merge of each face. Using this 3D modeling technique, a 3D model, which has a small data size but is geometrically exact, can be realistically generated. In a different method, the building model generation unit 74 may generate first 3D building models using aerial images. Further, the building model generation unit 74 finally generates desired 3D building models by modeling a preset area above the ground surface of the first 3D building models using terrestrial images via 3D modeling. That is, since a large number of buildings have structures on their rooftops, the building model generation unit 74 primarily generates 3D buildings using aerial images, and secondarily performs fine 3D modeling on the area close to the ground surface using terrestrial images. In this case, images captured by terrestrial cameras which do not work in conjunction with a position/posture sensor (for example, GPS/INS equipment) may be used. In this case, since the building model storage unit 40 already has building models which have been modeled in three-dimensions, those building models are rendered using virtual cameras which use the intrinsic parameters of the terrestrial cameras. As a result, the translation and rotation of each virtual camera which are approximate to those of images captured by 3D navigation are detected. Further, the positions and postures of the terrestrial cameras at the time that terrestrial images were captured can be calculated by designating principal vertexes of each 3D building and corresponding points of terrestrial images thereto. After the camera calibration of the terrestrial cameras has been performed in this way, the 3D buildings can be more finely modeled using the above 3D modeling technique.

The terrain model generation unit 76 generates a 3D terrain model by converting the digital elevation model received from the DEM input unit 20 into a 3D mesh. The digital to elevation model has heights relative to the respective plane coordinates of equally divided portions of the ground surface. Accordingly, the terrain model generation unit 76 converts the digital elevation model into a 3D mesh, thus generating the 3D terrain model.

The texture extraction unit 78 extracts the textures related to the building models provided by the building model generation unit 74 and the terrain model provided by the terrain model generation unit 76 from the aerial images and the terrestrial images received from the image input unit 10. By the 3D modeling procedure for the buildings, corresponding relationships between the individual faces constituting a relevant 3D building model and the images are detected. The texture extraction unit 78 extracts a texture related to each face of the 3D building model using information about the corresponding relationships. In this case, in order to extract high-resolution textures, the texture extraction unit 78 extracts an orthographically projected texture from an image in which the face occupies the largest portion by using a homography matrix. The texture extraction unit 78 extracts a texture related to a portion hidden by a tree or the like from an image captured from another position. If there is no image captured such that a relevant portion is not hidden by certain objects, the texture extraction unit 78 separates the hiding objects, deletes them and fills the hidden portion with surrounding values using an inpainting technique, thereby generating a texture in which a hidden portion is not present. Meanwhile, when the texture related to the terrain model is extracted, the texture extraction unit 78 extracts the texture by establishing corresponding relationships between the 3D mesh of the terrain and the images captured in a vertical direction from among the aerial images. When the vertical images (that is, images captured in the vertical direction) are used, the texture extraction unit 78 can extract the texture without using a homography matrix. With respect to a region from which vertical images are not present, the texture extraction unit 78 uses oblique images that are obliquely captured, or terrestrial images. Similarly, when there is a hiding object, the texture extraction unit 78 extracts a texture in which the hiding object has been deleted using an inpainting technique.

The model matching unit 80 generates a 3D urban model by matching the building models with the terrain model, which are based on the texture output from the texture extraction unit 78, with one another. Each of the plurality of 3D building models generated by the building model generation unit 74 has its own local coordinate system (including x, y, z information). The model matching unit 80 converts the local coordinate system of each 3D building model into a map projection coordinate system used in the digital elevation model, thus generating a 3D urban model in which the terrain matches buildings. That is, the matching of the 3D building models with the terrain model is realized by causing vertexes on the bottom surfaces of 3D building meshes to correspond to the 3D terrain which has been orthographically projected (or parallel projected in vertical direction). In this way, the 3D urban model generated by the model matching unit 80 is displayed to the user via the display unit 60 in such a way that an urban area is rendered by the manipulation of the user.

In the above-described FIG. 1, the image input unit 10, the DEM input unit 20, the translation and rotation data input unit 30, the building model storage unit 40, and the display unit 60 are constructed separately from the 3D modeling unit 50. If necessary, the image input unit 10, the DEM input unit 20, the translation and rotation data input unit 30, the building model storage unit 40, and the display unit 60 may also be included in the 3D modeling unit 50.

Then, a 3D urban modeling method according to an embodiment of the present invention will be described in detail with reference to the flowchart of FIG. 2.

The image input unit 10 receives aerial images captured over a relevant city, and terrestrial images captured on the ground, and the translation and rotation data input unit 30 receives pieces of data about the positions and postures of cameras at the time the aerial images and terrestrial images were captured from a position/posture sensor (not shown) at step S10. The pieces of data about the positions and postures of the cameras at the time the aerial and terrestrial images were captured are transmitted to the camera calibration unit 72.

The translation and rotation data obtained by the translation and rotation data input unit 30 contains errors owing to the velocity of the aircraft and vehicle in addition to the errors resulting from the position/posture sensor itself (for example, GPS/INS equipment; not shown). Accordingly, the camera calibration unit 72 performs exact camera calibration using corresponding points between the images so as to reduce such errors and exactly detect the positions and postures of the cameras at the time the images were captured at step S12. Meanwhile, with respect to images that have no data about the positions and postures of the cameras at the time that the images were captured, the camera calibration unit 72 can calculate the positions and postures of the cameras at the time that the images were captured by using the corresponding relationships between the vertexes of the 3D building models previously constructed in the building model storage unit 40 and the feature points of the images, and the previously calculated intrinsic parameters of the cameras.

The results of the calibration by the camera calibration unit 72 are transmitted to the building model generation unit 74. Accordingly, the building model generation unit 74 generates 3D building models based on aerial images and terrestrial images to which the results of the calibration by the camera calibration unit 72 have been applied at step S14. The generated 3D building models are stored in the building model storage unit 40.

While the 3D building models are generated in this way, the DEM input unit 20 receives a digital elevation model and transmits it to the terrain model generation unit 76 at step S16.

Since the digital elevation model has height values relative to the respective plane coordinates on equally divided portions of the ground surface, the terrain model generation unit 76 converts the digital elevation model into a 3D mesh, thereby generating a 3D terrain model at step S18. According to the above description, the operations of the process may be understood to be sequentially performed in the order of steps S10, S12, S14, S16, and S18, but it is preferably understood that operations at steps S10 to S14 and operations at steps S16 and S18 are simultaneously performed in practice.

The 3D building models and the 3D terrain model which are generated by the above operations are transmitted to the texture extraction unit 78.

The texture extraction unit 78 extracts textures related to the 3D building models and the terrain model from the aerial images and the terrestrial images input from the image input unit 10 at step 20. In order to avoid the repetitive description of the same contents, the description of the texture extraction unit 78 made with reference to FIG. 1 may replace a detailed description of the texture extraction.

When the textures are extracted, the 3D building and terrain models, and the textures extracted by the texture extraction unit 78 are transmitted to the model matching unit 80. Each of the 3D building models generated by the building model generation unit 74 has its own local coordinate system (including x, y, and z).

The model matching unit 80 converts the local coordinate system of each 3D building model into the map projection coordinate system used in the digital elevation model, thus generating a 3D urban model in which the terrain matches the buildings That is, the matching of the 3D building models with the terrain model is realized by causing vertexes on the bottom surfaces of the 3D building meshes to correspond to the orthographically projected 3D terrain at step S22.

The 3D urban model generated by the model matching unit 80 in this way is displayed to the user via the display unit 60 in such a way that the urban area is rendered by the manipulation of the user at step S24.

As described above, the present invention having the above construction can generate 3D meshes having realistic textures using digital terrain data, aerial images, and terrestrial images.

Further, the present invention utilizes both aerial and terrestrial images, thus producing a realistic scene from any point of view.

Furthermore, the present invention is advantageous in that since urban models are 3D urban models matching a digital elevation model, they can be variously utilized for 3D map services, urban planning, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. It should be understood that the technical spirit of such modifications, additions and substitutions are included in the scope of the accompanying claims.

What is claimed is:

1. A three-dimensional (3D) urban modeling apparatus, comprising:
a calibration unit for calibrating data about a translation and a rotation of at least one capturing device at a time that input aerial images and terrestrial images were captured;
a building model generation unit for generating at least one 3D building model based on the aerial images and the terrestrial images to which results of the calibration by the calibration unit have been applied;
a terrain model generation unit for generating a 3D terrain model by converting an input digital elevation model into a 3D mesh;
a texture extraction unit for extracting textures of buildings projected orthogonally from each face constituting the building model and textures of terrain related to the terrain model from the aerial images and the terrestrial images; and
a model matching unit for generating a 3D urban model by matching the building model with the terrain model, which are based on the textures of buildings and terrain, with each other.

2. The 3D urban modeling apparatus as set forth in claim 1, wherein the calibration unit selects captured images of buildings to be modeled from among the aerial images and the terrestrial images using the data about the translation and rotation of the capturing device, and calibrates the selected images.

3. The 3D urban modeling apparatus as set forth in claim 2, further comprising a translation and rotation data input unit for receiving the data about the translation and the rotation of the capturing device and transmitting the translation and rotation data to the calibration unit.

4. The 3D urban modeling apparatus as set forth in claim 1, wherein the calibration unit is configured such that when an image that has no data about the translation and the rotation of the capturing device is input, the calibration unit calculates the data about the translation and rotation of the capturing device at the time that the aerial images and the terrestrial images were captured, by using corresponding relationships between vertexes of a previously constructed 3D building model and feature points of the images and previously calculated intrinsic parameters of the capturing device.

5. The 3D urban modeling apparatus as set forth in claim 1, wherein the building model generation unit generates a first 3D building model by causing primitive figures forming a principal shape of a building to correspond to calibrated images, and generates the 3D building model by editing the first 3D building model using 3D mesh editing and by modeling a fine appearance of the building.

6. The 3D urban modeling apparatus as set forth in claim 1, wherein the building model generation unit generates a first 3D building model using the aerial images, and generates the 3D building model by modeling a preset area above a ground surface of the first 3D building model using the terrestrial images via 3D modeling.

7. The 3D urban modeling apparatus as set forth in claim 1, wherein the texture extraction unit extracts textures related to individual faces of the 3D building model using corresponding relationships between the faces constituting the 3D building model, generated by the building model generation unit, and the images.

8. The 3D urban modeling apparatus as set forth in claim 1, wherein the texture extraction unit extracts the orthographically projected textures in which a hidden portion is not present on each face constituting the building model.

9. The 3D urban modeling apparatus as set forth in claim 1, wherein the texture extraction unit extracts the textures of the terrain model by establishing corresponding relationships between images captured in a vertical direction, among the aerial images, and the terrain model.

10. The 3D urban modeling apparatus as set forth in claim 1, wherein the texture extraction unit extracts textures related to the terrain model such that a hidden portion is not present in the textures.

11. The 3D urban modeling apparatus as set forth in claim 1, wherein the model matching unit converts a coordinate system of the building model into a map projection coordinate system of the digital elevation model, thus generating the 3D urban model in which the building model matches the terrain model.

12. A three-dimensional (3D) urban modeling method, comprising:
  calibrating data about a translation and a rotation of at least one capturing device at a time that input aerial images and terrestrial images were captured, using a calibration unit;
  generating at least one 3D building model based on the aerial images and the terrestrial images to which results of the calibration have been applied, using a building model generation unit;
  generating a 3D terrain model by converting an input digital elevation model into a 3D mesh, using a terrain model generation unit;
  extracting textures of buildings projected orthogonally from each face constituting the building model and textures of terrain related to the terrain model from the aerial images and the terrestrial images, using a texture extraction unit; and
  generating a 3D urban model by matching the building model with the terrain model, which are based on the textures of the buildings and terrain, with each other, using a model matching unit.

13. The 3D urban modeling method as set forth in claim 12, wherein the calibrating the data is configured to perform calibration by selecting captured images of buildings to be modeled, from among the aerial images and the terrestrial images, using the data about the translation and rotation of the capturing device.

14. The 3D urban modeling method as set forth in claim 12, wherein the generating the 3D building model comprises:
  generating a first 3D building model by causing primitive figures forming a principal shape of a building to correspond to calibrated images; and
  editing the first 3D building model using 3D mesh editing and then modeling a fine appearance of the building.

15. The 3D urban modeling method as set forth in claim 12, wherein the generating the 3D comprises:
  generating a first 3D building model using the aerial images; and
  generating the 3D building model by modeling a preset area above a ground surface of the first 3D building model using the terrestrial images via 3D modeling.

16. The 3D urban modeling method as set forth in claim 12, wherein the extracting the textures is configured to extract textures related to individual faces of the building model using corresponding relationships between the faces constituting the building model and the images.

17. The 3D urban modeling method as set forth in claim 12, wherein the extracting the textures is configured to the extract orthographically projected textures in which a hidden portion is not present on each face constituting the building model.

18. The 3D urban modeling method as set forth in claim 12, wherein the extracting the textures is configured to extract the textures of the terrain model by establishing corresponding relationships between images captured in a vertical direction, among the aerial images, and the terrain model.

19. The 3D urban modeling method as set forth in claim 12, wherein the extracting the textures is configured to extract textures related to the terrain model such that a hidden portion is not present in the textures.

20. The 3D urban modeling method as set forth in claim 12, wherein the matching the models is configured to convert a coordinate system of the building model into a map projection coordinate system of the digital elevation model, thus generating the 3D urban model in which the building model matches the terrain model.

* * * * *